(12) United States Patent
Liang

(10) Patent No.: US 7,955,053 B1
(45) Date of Patent: Jun. 7, 2011

(54) TURBINE BLADE WITH SERPENTINE COOLING CIRCUIT

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 928 days.

(21) Appl. No.: 11/903,557

(22) Filed: Sep. 21, 2007

(51) Int. Cl.
*F01D 5/08* (2006.01)

(52) U.S. Cl. ...................... 416/97 R; 415/115; 416/96 R

(58) Field of Classification Search ................. 416/96 R, 416/97 R, 232, 233; 415/115
See application file for complete search history.

(56) References Cited

U.S. PATENT DOCUMENTS

| | | | |
|---|---|---|---|
| 3,799,696 A * | 3/1974 | Redman ...................... | 416/97 R |
| 4,236,870 A | 12/1980 | Hucul, Jr. et al. | |
| 4,278,400 A | 7/1981 | Yamarik et al. | |
| 4,292,008 A * | 9/1981 | Grosjean et al. ............ | 416/97 R |
| 4,416,585 A | 11/1983 | Abdel-Messeh | |
| 4,456,428 A | 6/1984 | Cuvillier | |
| 4,474,532 A | 10/1984 | Pazder | |
| 4,515,526 A | 5/1985 | Levengood | |
| 4,589,824 A | 5/1986 | Kozlin | |
| 4,775,296 A | 10/1988 | Schwarzmann et al. | |
| 4,786,233 A | 11/1988 | Shizuya et al. | |
| 5,052,889 A * | 10/1991 | Abdel-Messeh ............ | 416/97 R |
| 5,403,157 A | 4/1995 | Moore | |
| 5,503,527 A | 4/1996 | Lee et al. | |
| 5,674,050 A | 10/1997 | Hall et al. | |
| 5,695,322 A * | 12/1997 | Jacobson et al. ............ | 416/97 R |
| 5,967,752 A | 10/1999 | Lee et al. | |
| 5,971,708 A | 10/1999 | Lee | |
| 6,164,913 A | 12/2000 | Reddy | |
| 6,254,346 B1 | 7/2001 | Fukuno et al. | |
| 6,419,449 B2 | 7/2002 | Ferber | |
| 6,607,355 B2 | 8/2003 | Cunha et al. | |
| 6,641,362 B1 | 11/2003 | Anding et al. | |
| 6,874,987 B2 | 4/2005 | Slinger et al. | |
| 6,981,840 B2 | 1/2006 | Lee et al. | |
| 7,137,784 B2 | 11/2006 | Hall et al. | |
| 7,150,601 B2 * | 12/2006 | Pietraszkiewicz et al. . | 416/97 R |
| 7,198,468 B2 | 4/2007 | Papple | |

* cited by examiner

*Primary Examiner* — Igor Kershteyn
(74) *Attorney, Agent, or Firm* — John Ryznic

(57) ABSTRACT

A turbine blade, especially a turbine blade for the first or second stage of an industrial gas turbine engine, the turbine blade having an aft flowing triple pass serpentine cooling circuit with all convection cooled blade. The three passes or legs of the serpentine flow circuit are formed by a leading edge rib and a trailing edge rib that are both slanted in order to provide decreasing flow cross sectional areas in the three passes of legs. A mini serpentine flow circuit is formed on the blade tip and the beginning of the second leg of the circuit to prevent flow separation of the cooling air at the blade tip. The third leg of the circuit includes pin fins to promote heat transfer. A row of exit cooling slots are located along the trailing edge of the blade and are connected to the third leg to discharge cooling air out from the trailing edge region. Trip strips are located on the walls of the first and second legs to also promote heat transfer within these passages.

13 Claims, 3 Drawing Sheets

View A-A

View B-B

TURBINE BLADE WITH SERPENTINE COOLING CIRCUIT

BACKGROUND OF THE INVENTION

1. Field of the Invention

The present invention relates generally to a gas turbine engine, and more specifically to a turbine blade with an internal cooling air circuit.

2. Description of the Related Art Including Information Disclosed Under 37 CFR 1.97 and 1.98

In an industrial gas turbine engine, a hot gas flow is passed through a turbine to produce mechanical work used to drive an electric generator for power production. The turbine generally includes four stages of stator vanes and rotor blades to convert the energy from the hot gas flow into mechanical energy that drives the rotor shaft of the engine. It is well known in the art of gas turbine engines that the efficiency of the engine can be increased by increasing the gas flow temperature that enters the turbine. However, the turbine inlet temperature is limited to the material properties and cooling capabilities of the turbine parts. This is especially important for the first stage turbine vanes and blades since these airfoils are exposed to the hottest gas flow.

In order to allow for higher temperatures, turbine blade designers have proposed several complex internal blade cooling circuits to maximize the blade cooling through the use of convection cooling, impingement cooling and film cooling of the blade. FIGS. 1 and 2 show a prior art turbine blade with an aft flowing triple pass all convection cooled cooling circuit design. The blade cooling circuit includes a first pass cooling channel located along the leading edge, a second pass in the blade mid-chord region, and a third pass channel located along the trailing edge. The third leg or pass of the serpentine cooling circuit includes pin fins extending across the walls of the blade to promote heat transfer, and includes a row of exit cooling holes or slots to discharge the cooling air from the serpentine flow circuit and out from the blade. In the FIG. 1 prior art turbine blade cooling circuit, the blade leading edge is cooled with the first up pass of the multi-pass channel flow, a direct feed leading edge. The leading edge cooling passage in general has a rough triangular cross sectional shape in the spanwise direction of the blade as seen in FIG. 2. The inner surface area of the leading edge cooling passage reduces in the cross sectional area to the apex of an acute angle. The distribution of the cooling flow to the leading edge corner decreases and the substantial flow velocity as well as the internal heat transfer coefficient is comparatively reduced.

Several prior art turbine blades show triple pass aft flowing serpentine cooling circuits such as U.S. Pat. No. 4,775,296 issued to Schwarzmann et al on Oct. 4, 1998 and entitled COOLABLE AIRFOIL FOR A ROTARY MACHINE; U.S. Pat. No. 4,515,526 issued to Levengood on May 7, 1985 and entitled COOLABLE AIRFOIL FOR A ROTARY MACHINE; U.S. Pat. No. 4,786,233 issued to Shizuya et al on Nov. 22, 1988 and entitled GAS TURBINE COOLED BLADE; U.S. Pat. No. 4,236,870 issued to Hucul, Jr. et al on Dec. 2, 1980 and entitled TURBINE BLADE; U.S. Pat. No. 4,416,585 issued to Abdel-Messeh on Nov. 22, 1983 and entitled BLADE COOLING FOR GAS TURBINE ENGINE; U.S. Pat. No. 4,278,400 issued to Yamarik et al on Jul. 14, 1981 and entitled COOLABLE ROTOR BLADE; U.S. Pat. No. 6,164,913 issued to Reddy on Dec. 26, 2000 and entitled DUST RESISTANT AIRFOIL COOLING; U.S. Pat. No. 5,503,527 issued to Lee et al on Apr. 2, 1996 and entitled TURBINE BLADE HAVING TIP SLOT; U.S. Pat. No. 4,589,824 issued to Kozlin on May 20, 1986 and entitled ROTOR BLADE HAVING A TIP CAP END CLOSURE; U.S. Pat. No. 5,403,157 issued to Moore on Apr. 4, 1995 and entitled HEAT EXCHANGE MEANS FOR OBTAINING TEMPERATURE GRADIENT BALANCE; and, U.S. Pat. No. 7,198,468 B2 issued to Papple on Apr. 3, 2007 and entitled INTERNALLY COOLED TURBINE BLADE. none of these prior art turbine blades address the issue of blade tip cooling and flow separation described below and in which the present invention addresses.

It is therefore an object of the present invention to provide for a new serpentine flow cooling circuit for a turbine blade mid-chord tip region that can be used in a first or second stage turbine blade.

It is another object of the present invention to provide for a first or a second stage turbine blade with a triple pass cooling circuit having a low tapered airfoil or wide open tip geometry.

It is another object of the present invention to provide for a turbine blade with an improved blade outer tip region cooling capability.

BRIEF SUMMARY OF THE INVENTION

A first or second stage turbine blade with a triple pass serpentine flow cooling circuit with a first up pass channel located along the leading edge of the blade, a second pass located in the mid-chord region, and a third pass located along the trailing edge region of the blade. The first and second passes are separated by a slanted rib such that both the first and the second pass channels decrease in the cross sectional flow area in the downstream direction of the cooling air flow in order to improve the airfoil leading edge cooling effectiveness while maintaining the same basic cooling design of the blade with the same amount of cooling flow by reducing the airfoil leading edge cavity through flow area. This increases the channel through flow velocity and internal heat transfer coefficient.

In a second embodiment of the present invention, the second pass of the serpentine flow circuit includes a short axial mini serpentine flow cooling passage in the upstream end of the second pass in order to eliminate the blade tip section and blade tip turn region and mid chord section flow separation and greatly enhance the tip region cooling and reduce the blade tip turn pressure loss while providing for the blade mid-chord region cooling and support.

DETAILED DESCRIPTION OF THE INVENTION

Figure 1:
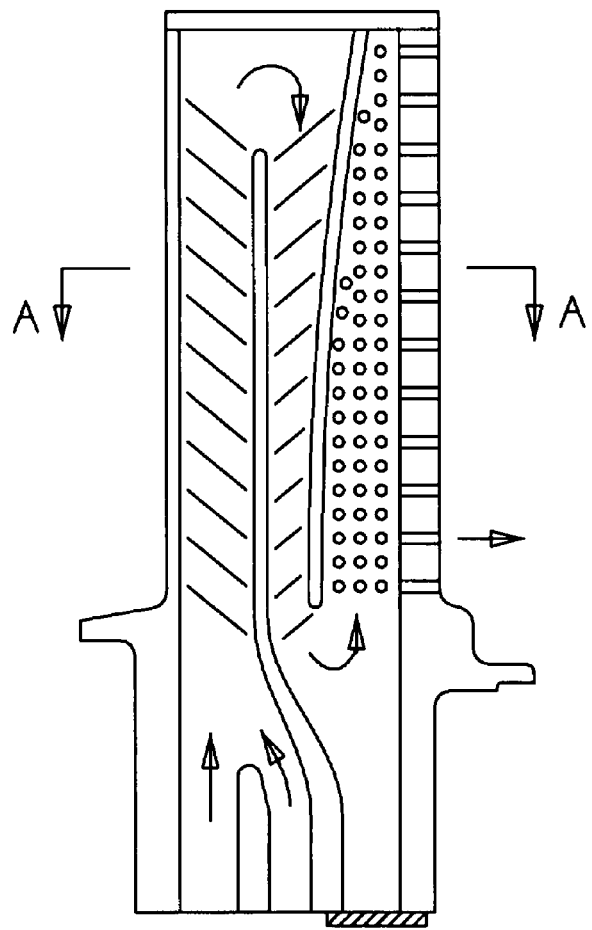
FIG. 1 show a cutaway view from the side of a prior art turbine blade with a triple pass serpentine flow cooling circuit.
Figure 2:
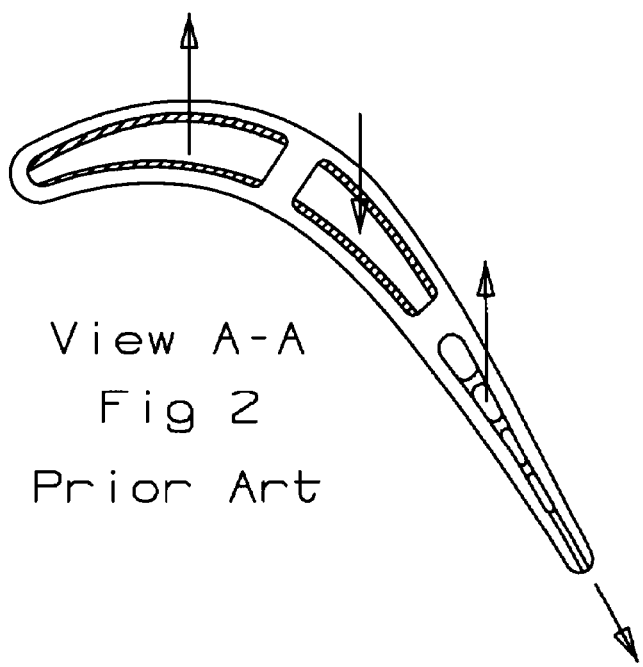
FIG. 2 shows a cross section view from the top of the prior art turbine blade of FIG. 1.
Figure 3:
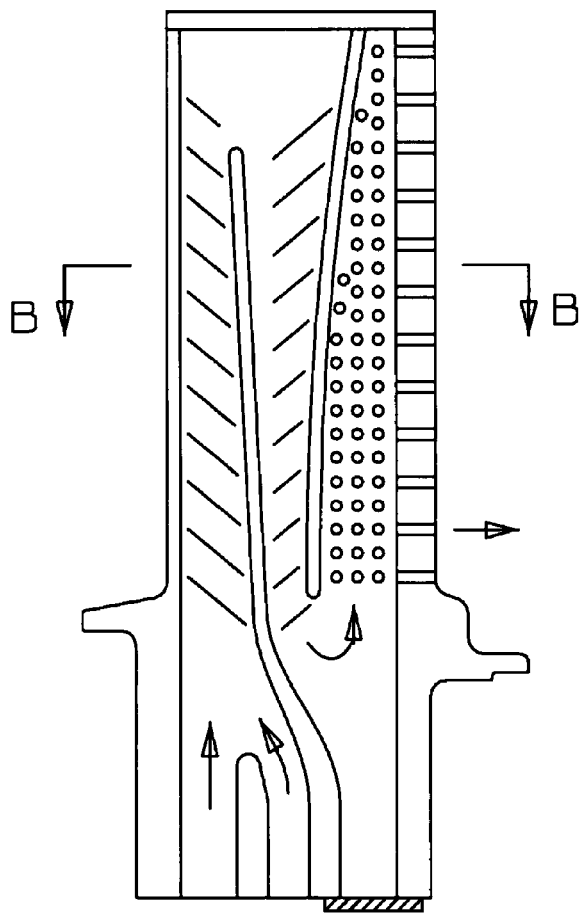
FIG. 3 shows a cutaway view from the side of the first embodiment of the triple pass cooling circuit of the present invention.
Figure 4:
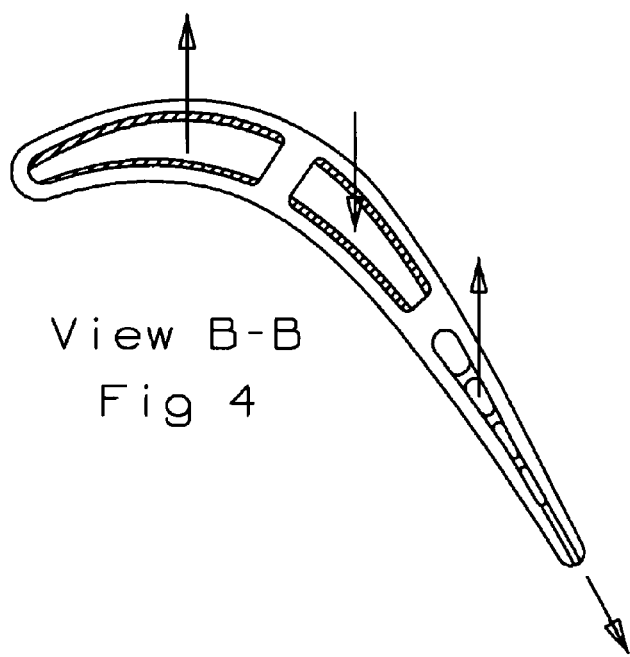
FIG. 4 shows a cross section view from the top of the blade of the present invention shown in FIG. 3.

The first embodiment of the present invention is shown in FIGS. 3 and 4 in which the turbine blade includes a triple or three-pass serpentine flow cooling circuit as in the prior art blade of FIG. 1, in which the first pass channel is located along the leading edge of the blade, the second pass is located in the blade mid-chord region, and the third pass is located along the trailing edge region and is connected to a row of trailing edge exit slots or holes to discharge the cooling air from the serpentine circuit. Trip strips and pin fins are also used in the channels to promote heat transfer from the hot metal walls to the cooling air flowing through the channels. In the present invention of the prior art turbine blade, the rib separating the first and second passes of the serpentine flow circuit is slanted toward the leading edge as seen in FIG. 3 in order to decrease the cooling flow cross sectional area of the first pass. The rib separating the first and second passes (or legs) is considered to be the leading edge rib, while the rib separating the second and third passes (or legs) is considered to be the trailing edge rib. Since the rib separating the second and third passes is also slanted as seen in FIGS. 1 and 3, the cross sectional flow area of the second pass is also decreasing in the cooling flow direction, which in the FIG. 3 blade is from blade tip to platform. The turbine blade of FIG. 3 is an aft flowing triple pass all convection cooled blade since no showerhead film cooling holes or pressure side or suction side film cooling holes are used. Only the exit cooling holes or slots are used, but these holes do not provide film cooling to the blade.

The slanted rib in the turbine blade of the present invention improves the airfoil leading edge cooling effectiveness of the prior art design of FIG. 1 while maintaining the same basic cooling concept with the same amount of cooling flow by reducing the airfoil leading edge cavity through flow area which increases the channel through flow velocity and the internal heat transfer coefficient. This is accomplished by repositioning the leading edge rib forward as shown in FIG. 3. As a result of this modification, the blade tip turn cooling flow area ratio is increased and yields a large unsupported mid-chord tip turn flow channel. The net impact due to this change in geometry will enhance the blade tip turn flow separation and recirculation issues, especially with a higher cooling flow exit velocity from the blade leading edge through flow channel. This induces a higher blade tip turn loss and over-temperature occurs at the locations of the blade tip turn regions corresponding to the flow separation. This separation problem becomes even more pronounced for a blade with a conical tip. Also, an increase of the airfoil mid-chord downward flowing channel flow area reduces the through flow velocity and lowers the internal heat transfer coefficient. Internal flow separation may occur for the mid-chord flow channel as well as tip turn region when the internal flow Mach number is too low for the FIG. 3 turbine blade cooling circuit.

Figure 5:
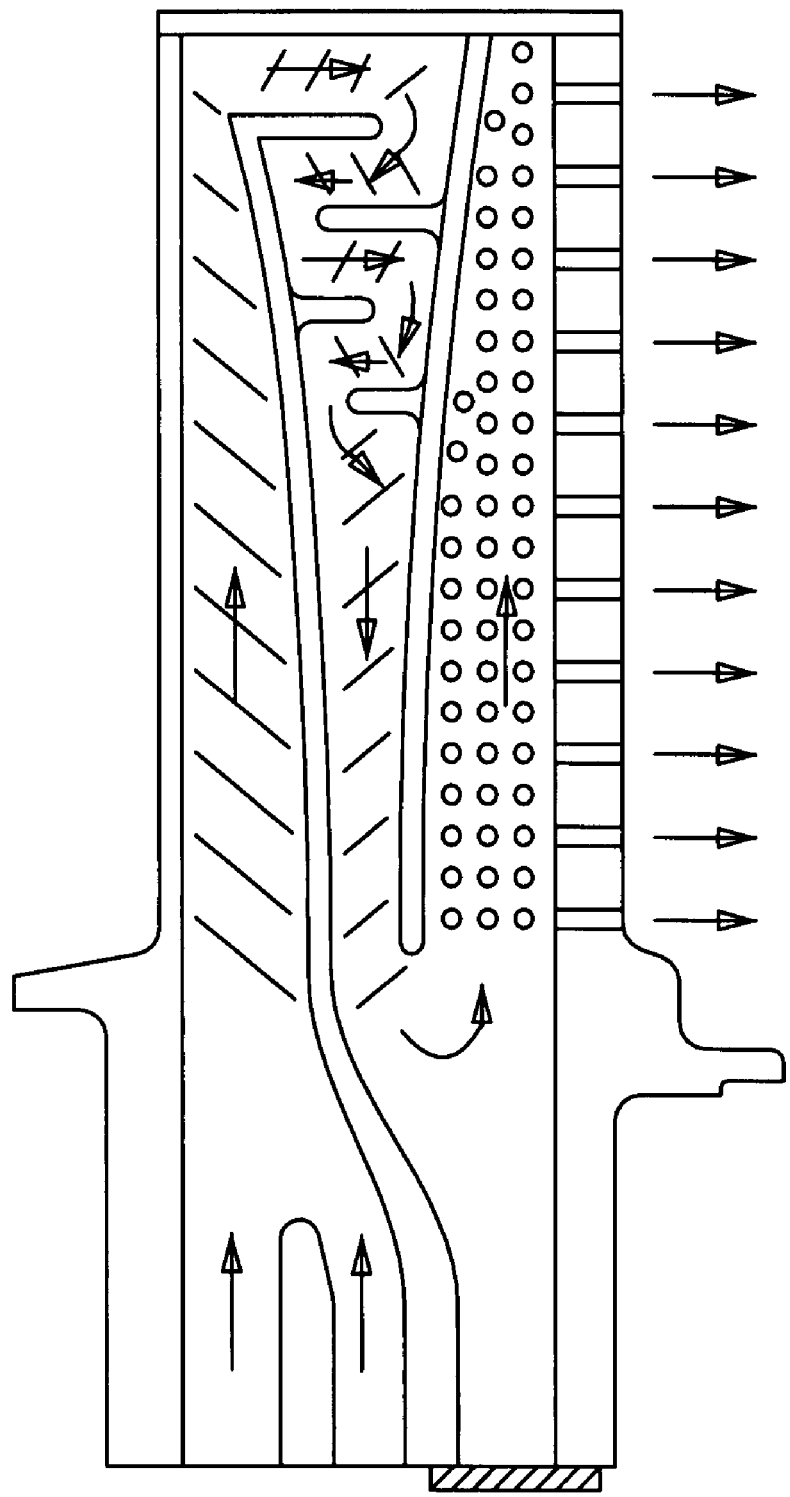
FIG. 5 shows cutaway view from the side of the blade of a second embodiment of the triple pass serpentine flow cooling circuit of the present invention.

The above described cooling flow separation and over-temperature issue can be eliminated by including an additional serpentine flow cooling flow circuit into the FIG. 3 radial flow serpentine cooling channel as shown in FIG. 5. The triple aft flowing serpentine cooling circuit with the axial mini serpentine cooling flow passage located in the upper region of the second pass channel will eliminate the blade tip section and blade tip turn region and mid-chord section flow separation issues and therefore greatly enhance the tip region cooling and reduce blade tip turn pressure loss while providing the blade mid-chord region with cooling and support. The axial mini serpentine cooling flow passage will require enough serpentine passages in the second pass channel in order to provide the added benefits of reducing or eliminating the cooling flow separation and over-temperature problem discussed above. At the end of the leading edge rib in FIG. 5, an axial extending rib extends toward the aft end of the blade and forms an axial flow channel just under the blade tip. The trailing edge rib extends from the blade tip and together with the axial extending rib directs the cooling air from the first leg along the blade tip and then into the second pass of the serpentine flow circuit. Additional axial extending ribs project out from the leading and trailing edge ribs and into the seconds pass channel to produce the mini serpentine flow circuit in the upper region of the second pass as seen in FIG. 5. The FIG. 5 embodiment of the turbine blade is also an aft flowing triple pass all convection cooled blade as is the FIG. 3 blade described above.

In operation, cooling flow channels through the leading edge cavity at high flow velocity will generate high rate of internal heat transfer coefficient. This cooling flow is then serpentine through the axial flowing serpentine passages located in the airfoil tip turn section. The total amount of the cooling air is accelerated to the outer section of the blade tip turn and the turn corners will receive more of the free stream cooling flow. This cooling flow arrangement will eliminate the cooling flow separation problem at the outer portion of the tip turn and provide effective cooling for that particular region. Also, the cooling air is first impinged onto the forward corner of the tip turn and then impinged onto the aft corner of the tip turn prior to exiting from the tip turn flow channel. The combination effects of impingement cooling and multi-elbow turns greatly improve the blade outer tip region cooling.

The total cooling air is then serpentines through the airfoil mid-chord section in the radial serpentine flow channels and provides cooling for the blade mid-chord section. The cooling air is then channeled through the root turn at the bottom of the blade and flows radially outward in the third pass of the serpentine flow channel and through the trailing edge cooling holes to provide cooling for the blade trailing edge corner.

The turbine blade of the present invention was described for use in a first or second stage of an industrial gas turbine engine. However, the blade can also be used in an aero engine used to power an aircraft.

I claim the following:

1. A turbine rotor blade comprising:
   a triple pass serpentine flow cooling circuit formed within the blade to provide cooling for the blade;
   the triple pass serpentine flow cooling circuit including a first leg located along the leading edge of the blade, a second leg located in the mid-chord region of the blade, and a third leg located along the trailing edge region of the blade;
   a leading edge rib separating the first leg from the second leg, the leading edge rib being slanted toward the leading edge of the blade such that the first leg channel decreases in the cross sectional flow area and directs the cooling to flow toward a tip corner of the leading edge of the blade;
   a trailing edge rib separating the second leg from the third leg, the trailing edge rib being slanted toward the trailing edge of the blade such that the third leg channel decreases in the cross sectional flow area.

2. The turbine rotor blade of claim 1, and further comprising:
   exit cooling holes along the trailing edge of the blade and connected to the third leg of the serpentine flow cooling circuit to discharge cooling air from the third leg out through the exit cooling holes.

3. The turbine rotor blade of claim 1, and further comprising:
   the leading edge rib and the trailing edge rib are slanted such that the second leg decreases in the cross sectional flow area in the direction of the cooling air flow through the second leg.

4. The turbine rotor blade of claim 1, and further comprising:
   the turbine blade is an aft flowing triple pass all convection cooled blade.

5. The turbine rotor blade of claim 1, and further comprising:
   the first leg, the second leg, and the third leg of the serpentine flow cooling circuit each extends substantially from the platform region to the tip region of the blade.

6. The turbine rotor blade of claim 1, and further comprising:
   an axial flow passage located below the blade tip and between the first pass and the second pass of the serpentine flow circuit, the axial flow passage providing cooling for the blade tip.

7. The turbine rotor blade of claim 6, and further comprising:
   trip strips located on the walls of the axial flow passage to promote heat transfer coefficient.

8. The turbine rotor blade of claim 1, and further comprising:
   the leading edge rib gradually curves toward the leading edge of the blade.

9. A turbine rotor blade comprising:
   a triple pass serpentine flow cooling circuit formed within the blade to provide cooling for the blade;
   the triple pass serpentine flow cooling circuit including a first leg located along the leading edge of the blade, a second leg located in the mid-chord region of the blade, and a third leg located along the trailing edge region of the blade;
   a leading edge rib separating the first leg from the second leg, the leading edge rib being slanted toward the leading edge of the blade such that the first leg channel decreases in the cross sectional flow area;
   a trailing edge rib separating the second leg from the third leg, the trailing edge rib being slanted toward the trailing edge of the blade such that the third leg channel decreases in the cross sectional flow area and,
   a mini axial flow serpentine cooling circuit on the forward end of the second pass of the serpentine flow cooling circuit.

10. The turbine rotor blade of claim 9, and further comprising:
    the mini axial flow serpentine cooling circuit includes an axial flow passage downstream from the first leg and positioned under the blade tip to provide cooling for the blade tip, and a plurality of axial extending ribs extending from the leading edge trailing edge ribs in an alternating arrangement such that a serpentine flow path is formed.

11. The turbine rotor blade of claim 10, and further comprising:
    trip strips are located along the walls of the first and second passes of the serpentine flow cooling circuit; and,
    pin fins are located in the third pass of the serpentine flow cooling circuit.

12. The turbine rotor blade of claim 11, and further comprising:
    exit cooling holes along the trailing edge of the blade and connected to the third leg of the serpentine flow cooling circuit to discharge cooling air from the third leg out through the exit cooling holes.

13. The turbine rotor blade of claim 9, and further comprising:
    the mini axial flow serpentine cooling circuit extends along the second pass long enough to prevent separation of the cooling flow along the blade tip turn.

* * * * *